United States Patent [19]
Pilie et al.

[11] 3,889,532
[45] June 17, 1975

[54] FOG WATER COLLECTOR

[75] Inventors: Roland J. Pilie, Williamsville; Eugene J. Mack, Alden, both of N.Y.

[73] Assignee: The United States of America as represented by the Secretary of the Navy, Washington, D.C.

[22] Filed: Aug. 28, 1974

[21] Appl. No.: 501,306

[52] U.S. Cl. .......................... 73/170 R; 73/421.5 R
[51] Int. Cl.² ............................................ G01W 1/00
[58] Field of Search......... 73/171, 29, 421.5 R, 335, 73/170 R; 239/14

[56] References Cited
UNITED STATES PATENTS

| | | | |
|---|---|---|---|
| 3,534,907 | 10/1970 | Bellis | 239/14 |
| 3,681,973 | 8/1972 | Ludwig | 73/421.5 R |
| 3,826,135 | 7/1974 | Hollmann | 73/171 |

*Primary Examiner*—Donald O. Woodiel
*Assistant Examiner*—Marcus S. Rasco
*Attorney, Agent, or Firm*—R. S. Sciascia; P. Schneider; W. S. Sheehan

[57] ABSTRACT

Apparatus for collecting fog water consists of a slotted stainless steel rotatable tube. The tube is rotated and fog droplets are collected by impaction on the tube. Centrifugal force causes the water to flow outward toward the ends of the tube where it is collected in small vials.

6 Claims, 2 Drawing Figures

FOG WATER COLLECTOR

BACKGROUND OF THE INVENTION

The present invention relate to the collection of fog water and, more particularly, to the collection of fog water by a rotating slotted tubular member which collects the fog water within the slot by impaction and delivers the water to small vials located at both ends of the tubular members.

It is known generally that fog water is comprised of minute droplets of water, ranging from about 2 to 50 microns in radius, condensed on at least partially soluble particulates. However, the fog droplets may scavenge additional particulates and gaseous constituents from the atmosphere which may alter the chemical composition of the droplets. The composition at any given time is an important consideration since the response of the droplets, such as evaporation or growth, to changes in relative humidity is determined in part by the concentration and composition of dissolved salts within the droplets.

Prior techniques for collecting fog water consisted of using a filter media to capture the water, on impaction and dripping from large obstacles such sails, trees and wire screens. Deficiencies of these prior techniques include contamination of samples, excessive time requirements for collection of sufficient samples, and dependence upon a minimum drop size.

The present invention offers the unique advantage of near-complete collection of large quantities of fog droplets of various sizes in a relatively short time interval and is capable of collection rates in excess of one milliliter of fog water per minute, depending on drop size and liquid water content of the fog.

The apparatus of the invention provides a means for collecting sufficient amounts of fog water so that it can be chemically analyzed to determine its composition.

SUMMARY OF THE INVENTION

The present fog water collector takes advantage of the mass of individual fog droplets for collection and uses centrifugal force to concentrate the collected droplets into a sample large enough for chemical analysis. The collector is a hollow slotted tube having small vials at each end to collect the water. The tube is rotated about its center point with fog droplets passing through the slots and impacting on the inside wall of the tube. The centrifugal force, created by rotation of the tube, causes the droplets to move to the ends of the tube where they are accumulated in the vials.

OBJECTS OF THE INVENTION

An object of the invention is to provide a simple and efficient apparatus for collecting large quantities of fog droplets in relatively short time intervals.

Another object of the invention is to collect large quantities for water with apparatus which is of relatively light weight, inexpensive to manufacture and is less cumbersome than prior art techniques.

BRIEF DESCRIPTION OF THE DRAWINGS

Other objects, advantages, and novel features of the present invention will become apparent from the following detailed description of the invention when considered in conjunction with the accompanying drawings, in which:

In FIG. 1, the fog water collector 10 of the invention includes a one-horsepower electric motor 12 which is supported by a stand 14. Drive shaft 16 of motor 12 is connected to an elongated of hollow stainless steel tube 15 whose halves 18 and 20 are each approximately 40 Cm long and 0.9 Cm in diameter. For typical fog droplet sizes and practical impaction velocities such as 20 to 100 m/sec the tubes over which the fog-laden air must flow cannot be wider than about 1 Cm, otherwise small droplets would tend to flow around the tubes instead of impacting on them. It will be obvious that any number of tubes can be used, with the primary requirement being a balanced rotation of the shaft 16. In the embodiment shown, a single tube 80 Cm long is inserted through a diametric aperture in the drive shaft 16 so that it extends approximately 40 Cm radially outward in opposite directions from the center of the drive shaft, thus giving the appearance of two tubular members 18 and 20. Small collectors such as polypropylene vials 22 and 24 are attached to the ends of the tubes 18 and 20, respectively and act as containers or receivers for the fog water.

Turning to FIG. 2, the upper or top half 18 of the collector tube 15, and vial 22 are shown more clearly. The half 18 has a slotted opening 26 which exposes the hollow central portion of the tube. The opening should extend approximately 21 Cm of the total 40 Cm length of each of the tubes. The two slotted openings in both halves of the tube are always formed on the side of the tube facing the direction of rotation so that a slot formed in tube 20 would be on the back side of the apparatus shown in FIG. 1 (on the wall opposite to the slot in the other half of the tube) and would not be visible in that view. The vials may be removably attached to the tube in any convenient manner, such as forming screw thread on both the vial and the tube so that the vial may be easily removed when filled.

Figure 1:
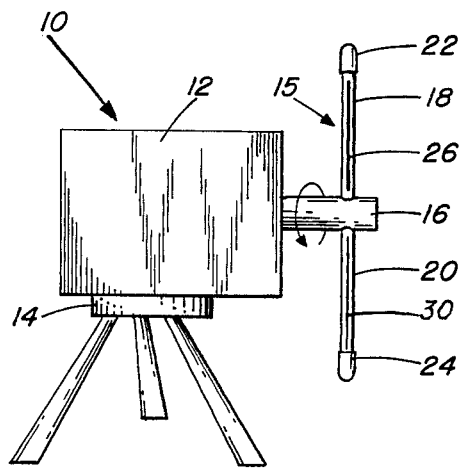
FIG. 1 is side elevation of the fog water collector of the present invention.
Figure 2:
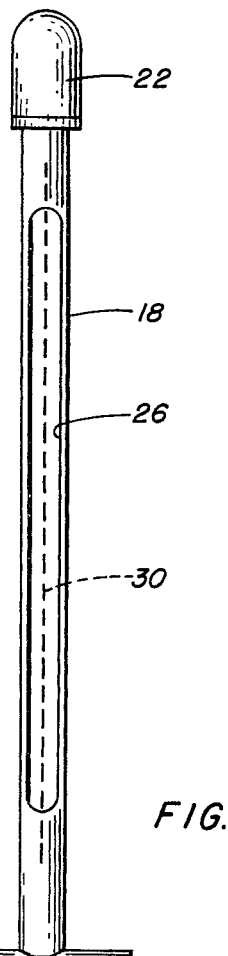
FIG. 2 is a close up view of the tubular collector portion of the fog water collector.

The tube 15 may be rotated at approximately 1600 rpm and fog droplets pass through oppositely disposed slots and are collected by impaction on the inside walls of the tube. Fins may be provided on the side of the tube opposite the slotted openings to provide added strength and prevent bending of the tubes, as shown by dotted line 30 in FIG. 2. For example, the fins can be welded to the back side of the tube. Impaction velocities range linearly from 15 to 50 m/sec along the length of the slots provide minimum collection efficiencies ranging from 55 to 75% for droplets of 4 mm radius and larger. Collection rates in excess of 1 ml/min have been achieved with the invention in a dense fog having visibilities of 100–200 m. Increasing the speed of rotation or width of the slot improves the collection efficiency for even smaller drops and increases the volume swept - out per unit time and, thus, provides even greater collection rates.

There has been described a new and simple way of collecting samples of fog water so that it may be chemically analyzed. Obviously, may modifications and variations of the present invention are possible in light of the above teachings. It is therefore to be understood that, within the scope of the appended claims, the invention may be practiced otherwise than as specifically described.

What is claimed is:

1. A fog water collector comprising:
   at least one hollow elongated tube having a slotted opening formed along a substantial portion of the length of said tube;
   means for rotating said tube in a direction such that said fog water passes through said slotted opening and impacts on the back wall of said tube; and
   removable container means for each said tube, said container means receiving the fog water impacted on said tube as it moves to the ends of said tube under the influence of the centrifugal rotational force.

2. The fog water collector of claim 1, wherein said tube is formed of stainless steel.

3. The fog water collector of claim 1, wherein said container means is a polypropylene vial which is threaded onto the end of said tube.

4. The fog water collector of claim 1, wherein said means for rotating said tube is a one horsepower electric motor operating at approximately 1600 rpm.

5. The fog water collector of claim 1, wherein said tube has reinforcing fins welded to the tube diametrically opposite said slotted opening.

6. A fog water collector comprising:
   at least one hollow elongated tube having a slotted opening formed along a substantial portion of the length of said tube;
   means for rotating said tube, said slotted opening facing in the direction of rotation so that said fog water passes through said opening and impacts on the back wall of said tube; and
   at least one removable container means for each said tube, said container means receiving the fog water impacted on said tube as it moves to the ends of said tube under the influence of the centrifugal rotational force.

* * * * *